US010464597B2

(12) United States Patent
Rasbornig

(10) Patent No.: US 10,464,597 B2
(45) Date of Patent: Nov. 5, 2019

(54) APPARATUS AND METHOD FOR MONITORING A SIGNAL PATH, AND SIGNAL PROCESSING SYSTEM

(71) Applicant: Infineon Technologies AG, Neubiberg (DE)

(72) Inventor: Friedrich Rasbornig, Klagenfurt (AT)

(73) Assignee: Infineon Technologies AG (DE)

( * ) Notice: Subject to any disclaimer, the term of this patent is extended or adjusted under 35 U.S.C. 154(b) by 235 days.

(21) Appl. No.: 15/484,503

(22) Filed: Apr. 11, 2017

(65) Prior Publication Data

US 2017/0297615 A1    Oct. 19, 2017

(30) Foreign Application Priority Data

Apr. 13, 2016 (DE) .................. 10 2016 106 814

(51) Int. Cl.
| | |
|---|---|
| *B62D 5/04* | (2006.01) |
| *G01B 7/30* | (2006.01) |
| *G01L 3/10* | (2006.01) |
| *G01L 5/22* | (2006.01) |
| *G07C 5/08* | (2006.01) |
| *H04B 3/46* | (2015.01) |
| *H04B 14/02* | (2006.01) |

(52) U.S. Cl.
CPC .......... *B62D 5/0481* (2013.01); *B62D 5/049* (2013.01); *G01B 7/30* (2013.01); *G01L 3/101* (2013.01); *G01L 5/221* (2013.01); *G07C 5/08* (2013.01); *H04B 3/46* (2013.01); *H04B 14/026* (2013.01)

(58) Field of Classification Search
CPC ........ B62D 5/0481; B62D 5/049; H04B 3/46; H04B 14/026; G01L 5/221; G01L 3/101; G01B 7/30; G07C 5/08
See application file for complete search history.

(56) References Cited

U.S. PATENT DOCUMENTS

| | | | |
|---|---|---|---|
| 5,207,091 A | 5/1993 | Shibata et al. | |
| 6,357,024 B1* | 3/2002 | Dutton | G06F 11/1641 714/45 |
| 7,272,750 B2* | 9/2007 | Sirbu | G06F 11/2257 709/224 |
| 7,979,783 B2* | 7/2011 | Goessel | G06F 11/10 712/215 |
| 8,207,745 B2 | 6/2012 | Sato et al. | |
| 8,280,247 B1 | 10/2012 | Forsberg | |
| 9,555,829 B2 | 1/2017 | Sprinzl | |

(Continued)

FOREIGN PATENT DOCUMENTS

| | | |
|---|---|---|
| DE | 600 35 062 T2 | 1/2008 |
| DE | 10 2010 007 349 A1 | 8/2010 |
| DE | 10 2001 083 111 A1 | 3/2012 |
| DE | 10 2010 043 915 A1 | 5/2012 |

(Continued)

*Primary Examiner* — Mary Cheung
(74) *Attorney, Agent, or Firm* — Design IP

(57) ABSTRACT

An apparatus for monitoring a signal path is provided. The signal path includes a first processing unit, which generates a first signal based on an input signal of the signal path, and a second processing unit, which generates an output signal of the signal path, wherein the output signal depends on the first signal. The apparatus includes an output estimation module configured to determine an estimated output signal of the second processing unit based on the input signal. Further, the apparatus includes a comparison module configured to determine a state of the signal path based on a deviation of the output signal from the estimated output signal.

26 Claims, 4 Drawing Sheets

(56) References Cited

U.S. PATENT DOCUMENTS

| | | | |
|---|---|---|---|
| 2010/0191425 A1* | 7/2010 | Murata | B60R 21/0132 |
| | | | 701/45 |
| 2012/0074972 A1 | 3/2012 | Rasbornig et al. | |
| 2012/0150459 A1* | 6/2012 | Kim | G01R 31/2812 |
| | | | 702/58 |
| 2014/0172236 A1 | 6/2014 | Nishikawa et al. | |
| 2014/0214970 A1* | 7/2014 | Rasbornig | H04B 1/16 |
| | | | 709/206 |
| 2015/0057908 A1 | 2/2015 | Carbonaro et al. | |
| 2015/0109157 A1* | 4/2015 | Caldwell | H03M 3/458 |
| | | | 341/143 |
| 2015/0239492 A1 | 8/2015 | Yukitake | |
| 2017/0353161 A1* | 12/2017 | Loeffler | H03F 1/0222 |

FOREIGN PATENT DOCUMENTS

| | | | | |
|---|---|---|---|---|
| EP | 2947872 A2 | 11/2015 | | |
| JP | 56054519 A | 5/1981 | | |
| JP | S56 54519 A | 5/1981 | | |
| JP | 2002 037112 A | 2/2002 | | |
| JP | 2002037112 A | 2/2002 | | |
| JP | 2003516026 A | 5/2003 | | |
| JP | 2004 093239 A | 3/2004 | | |
| JP | 2004093239 A | 3/2004 | | |
| JP | 2006 228002 A | 8/2006 | | |
| JP | 2006228002 A | 8/2006 | | |
| JP | 2010203903 A | 9/2010 | | |
| JP | 2010266260 A | 11/2010 | | |
| JP | 2015 081013 A | 4/2015 | | |
| JP | 2015081013 A | 4/2015 | | |
| WO | 01 39405 A1 | 5/2001 | | |
| WO | WO-2016110315 A1 * | 7/2016 | | H03F 1/0222 |

* cited by examiner

APPARATUS AND METHOD FOR MONITORING A SIGNAL PATH, AND SIGNAL PROCESSING SYSTEM

FIELD

Examples relate to an apparatus and a method for monitoring a signal path, and a signal processing system including a signal path and an apparatus for monitoring a signal path.

BACKGROUND

Monitoring of signal processing within signal paths is often desirable in order to verify correct operation of the signal path. Monitoring the signal path may allow to determine a state of the signal path. This may be of interest, if a system relies on sensor data processed by a signal path in order to trigger safety measures. For example, in automotive vehicles, a steering wheel angle sensor provides information on a steering angle of the vehicle's steering wheel, which is used by an Electronic Control Unit (ECU) in order to control a driver for the mechanics of the steering system. In the event of an error or due to degradation of functionality within the signal path, wrong information may be submitted and the safety of the passengers of the car may be at risk. Therefore, safety relevant applications or systems in an automotive vehicle (e.g., electronic power steering) need to accomplish Automotive Safety Integrity Level D (ASIL D). That is, a single point failure metric above 99% and a latent failure metric above 90% is to be accomplished. Hence, there may be a desire to monitor a signal path in order to be aware of a state of the signal path.

SUMMARY

An example relates to an apparatus for monitoring a signal path. The signal path comprises a first processing unit, which generates a first signal based on an input signal of the signal path, and a second processing unit, which generates an output signal of the signal path, wherein the output signal depends on the first signal. The apparatus comprises an output estimation module configured to determine an estimated output signal of the second processing unit based on the input signal. Further, the apparatus comprises a comparison module configured to determine a state of the signal path based on a deviation of the output signal from the estimated output signal. Determining a deviation of the signal path's output signal from an estimated output signal of the signal path may allow to determine whether the signal path is working properly. An apparatus according to the example may, hence, allow to determine a state of the monitored signal path. That is, the apparatus may indicate whether the monitored signal path operates as desired and whether the output signal of the signal path is reliable.

Another example relates to a signal processing system comprising a signal path as well as an apparatus for monitoring a signal path. The signal path comprises a first processing unit and a second processing unit, wherein the first processing unit is configured to generate a first signal based on an input signal of the signal path, and wherein the second processing unit is configured to generate an output signal of the signal path, which depends on the first signal. A signal processing system according to the example may allow to determine whether the output signal provided by the signal path within the signal processing system is reliable.

A further example relates to a method for monitoring a signal path. The signal path comprises a first processing unit, which generates a first signal based on an input signal of the signal path, and a second processing unit, which generates an output signal of the signal path, wherein the output signal depends on the first signal. The method comprises determining an estimated output signal of the second processing unit based on the input signal, and determining a state of the signal path based on a deviation of the output signal from the estimated output signal. Determining a deviation of the signal path's output signal from an estimated output signal of the signal path may allow to determine whether the signal path is working properly. Hence, a state of the monitored signal path may be determined. That is, the method may indicate whether the monitored signal path operates as desired and whether the output signal of the signal path is reliable.

Another example relates to a computer program having a program code for performing the above method, when the computer program is executed on a computer or processor.

BRIEF DESCRIPTION OF THE DRAWINGS

Some embodiments of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent", to name just a few examples).

The terminology used herein is for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong, unless expressly defined otherwise herein.

Figure 1:
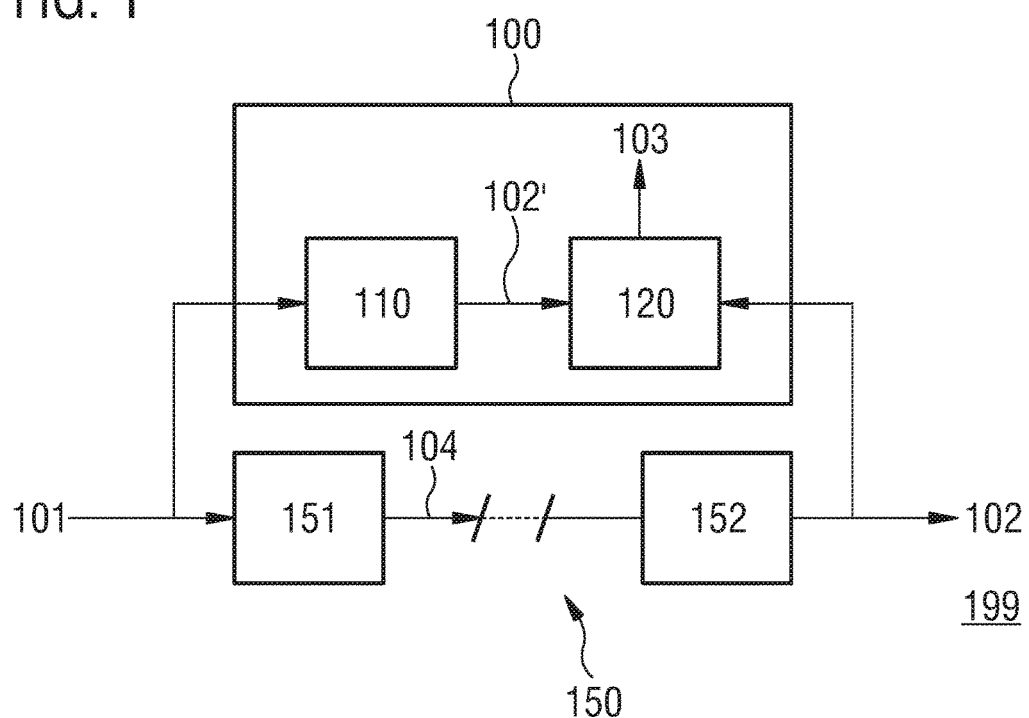
FIG. 1 illustrates an example of an apparatus for monitoring a signal path.

FIG. 1 schematically illustrates an apparatus 100 for monitoring a signal path 150. For illustrative purposes only, FIG. 1 also illustrates an example of the signal path 150. The signal path 150 comprises a first processing unit 151, which generates a first signal 104 based on an input signal 101 of the signal path 150. The signal path 150 further comprises a second processing unit 152, which generates an output signal 102 of the signal path 150. The output signal 102 depends on the first signal 104. The first processing unit and/or the second processing unit 152 may comprise one or more microprocessors or microcontrollers and a memory for storing dedicated software.

It is to be noted that the data processing in the signal path 150 may be expressed as a data flow or stream along the signal path 150. The data processing of the signal path 150 may be expressed in a functional manner and is typically known for a given application. Individual steps of the data processing may be implemented with functional units realizing an individual step of the data processing performed along the signal path 150. Without limitation some or all of these individual units may also be implemented as a piece of software or code performing the individual step of data processing.

As indicated by the signal path 150, the first processing unit 151 corresponds to the beginning of the signal path 150, whereas the second processing 152 corresponds to the end of the signal 150. The signal path 150 may comprise an arbitrary number of further signal processing components connected in an arbitrary manner between the first processing unit 151 and the second processing unit 152 in order to further process the first signal 104. Individual signal processing components may, e. g., be amplifiers, comparators, filters, analog-to-digital or digital-to-analog converters or more complex digital circuitry. However, the first processing unit 151 and the second processing unit 152 may in some examples be coupled directly, i.e. no further signal processing components are connected between the first processing unit 151 and the second processing unit 152.

The input signal 101 of the signal path 150 may be an analog signal or a digital signal (e.g. using Short PWM Code, SPC, protocol or Peripheral Sensor Interface 5, PSI5, protocol). Depending on the particular implementation, the output signal 102 of the signal path 150 may be an analog signal or a digital signal. Similarly, the first signal 104 may be an analog signal or a digital signal.

The apparatus 100 comprises an output estimation module 110 configured to determine an estimated output signal 102' of the second processing unit 152 based on the input signal 101. The estimated output signal 102' may in some examples be determined by processing the input signal 101 using the processing algorithm of the signal path 150, or essentially the processing algorithm of the signal path 150. For example, identical operations with reduced accuracy or resolution may be performed by the estimation module 110. In some examples, the estimated output signal 102' may be determined using a look-up table. The look-up table may comprise information on a plurality of estimated output signals, which are allocated to different input signals. For example, the look-up table may comprises information on a first estimated output signal, which is allocated to a first input signal, and information on a different second estimated output signal, which is allocated to a second input signal, wherein the second input signal is different from the first input signal. That is, the estimated output signal 102' may be determined by real-time calculation, or by referring to predetermined information on estimated output signals (i.e. using a priori knowledge on the behavior of the components within the monitored signal path 150 assuming they operate without error). It is obvious for a person skilled in the art, that the determination of the estimated output signal 102' may be based on additional or different criteria.

Moreover, the apparatus 100 comprises a comparison module 120 configured to determine a state 103 of the signal path 150 based on a deviation of the output signal 102 from the estimated output signal 102'. For determining the deviation of the output signal 102 from the estimated output signal 102', a variety of criteria may be used. For example, signal shapes, slopes, pulse-widths or amplitudes of the output signal 102 and the estimated output signal 102' may be compared. In some examples, two or more criteria may be considered for determining the deviation of the signals. An absolute degree or a relative degree of deviation of the output signal 102 from the estimated output signal 102' may be determined. For example, an absolute or a relative deviation of a pulse-width of the output signal 102 and the estimated output signal 102' may be determined. Based on the deviation of the output signal 102 from the estimated output signal 102', the state of the signal path 150 is determined. That is, different states of the signal path 150 may be assigned to different degrees of deviation. For example, a first state may be assigned to a first deviation range, a second state may be assigned to a different second deviation range, a third state may be assigned to a different third deviation range, etc. Accordingly, the apparatus 100 may indicate whether the monitored signal path 150 operates as desired (required). That is, the apparatus 100 may indicate whether the output signal 102 of the signal path 150 is reliable. By selecting the granularity of states for the monitored signal path 150, the functionality (operability) of the signal path 150 may be determined with the required accuracy.

In some examples, the comparison module 120 may, e.g., be configured to determine a first state of the signal path 150 if the deviation of the output signal 102 from the estimated output signal 102' is below a first threshold. Further, the comparison module 120 may be configured to determine a second state of the signal path 150 if the deviation of the output signal 102 from the estimated output signal 102' is below a different second threshold. That is, the comparison module 120 determines the second state if the deviation of the output signal 102 from the estimated output signal 102' is between the first threshold and the second threshold. Moreover, the comparison module 120 may be configured to determine a third state of the signal path 150 if the deviation of the output signal 102 from the estimated output signal 102' is greater than the second threshold. Accordingly, the functionality of the signal path 150 may be classified in three states. Hence, a finer description of the functionality of the signal path 150 may be possible compared to conventional two state descriptions (e.g. functional/non-functional).

For example, the first state may indicate normal operation of the signal path 150, i.e., the first state may indicate that the signal path 150 is operating without errors. The second state may indicate degradation of functionality of the signal path 150, i.e., the second may indicate that the functionality of the signal path 150 is limited but still acceptable. The remaining third state may indicate failure of the signal path 150, i.e., the second may indicate that the functionality of the signal path 150 is unacceptably limited or that malfunction of the signal path 150 occurred. Based on the detailed information on the state of the signal path 150, operation of a component receiving the output signal 102 of the signal path 150 may be adjusted. For example, the output signal 102 may be used normally for the first state, still be used for the second state, and not be used for the third state. However, the second state may, e.g., be a trigger for the component to perform additional reliability, consistency or plausibility checks. Accordingly, the signal path 150 may still be used in an application if the functionality of the signal path 150 is non-critically limited.

In other words, FIG. 1 illustrates a signal processing system 199, which comprises a signal path 150 and an apparatus 100 for monitoring a signal path. The monitored signal path 150 comprises a first processing unit 151 and a second processing unit 152, wherein the first processing unit 151 is configured to generate a first signal 104 based on an input signal 101 of the signal path 150, and wherein the second processing unit 152 is configured to generate an output signal 102 of the signal path 150, which depends on the first signal 104. The signal processing system 199 may, hence, allow to determine whether the output signal 102 provided by the signal path 150 within the signal processing system 199 is reliable. That is, the determined state of the signal path 150 may indicate a degree of functionality of the signal path 150.

In some examples, the signal processing system 199 may comprise a component coupled to the signal path to provide the input signal 101. The component may in general be any component being able to provide an input signal for the signal path 150. For example, the component may be another signal processing component or a sensor element.

Figure 2:
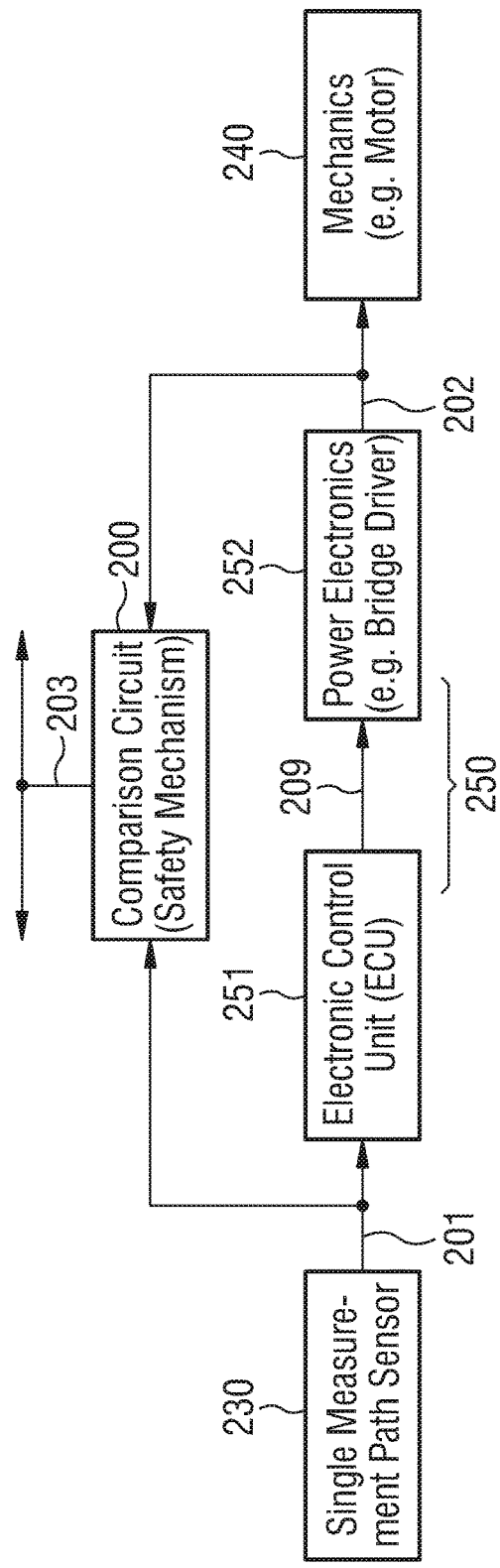
FIG. 2 illustrates an example of a signal processing system.

An example of a signal processing system further comprising a component for providing the input signal is illustrated in FIG. 2. The signal processing system illustrated in FIG. 2 is a signal processing system in an automotive vehicle. The component for providing the input signal comprises a sensor element 230 configured to provide a sensor signal 201 indicative of a physical quantity as the input signal of the signal path 250.

The first processing unit of the signal path 250 is an ECU 251 of the automotive vehicle, which generates a first signal 204 based on the input sensor signal 201. The ECU 251 may comprise one or more microprocessors or microcontrollers for processing the sensor signals 201 according to instructions of a computer program stored in the ECU 251. For example, the ECU 251 may digitize, filter or amplify the sensor signal 201. Moreover, the ECU 251 may perform safety checks in order to verify correct operation of the sensor element 230. In some examples, the ECU 251 may further combine the sensor signal 201 with one or more further signals. As a result of the processing, the first signal 204 is output by the ECU 251.

The second processing unit of the signal path 250 is a driver 252 of an actuator 240 of the automotive vehicle. The driver 252 receives the first signal 204 from the ECU 251 as an input. The driver 252 generates a control signal for the actuator 240 as an output signal 202 of the signal path 250. The output signal 202 depends on the first signal 204, i.e., it depends on the sensor signal 201. The output signal 202 contains information for adjusting the actuator 240. The output signal 202 may be a digital signal or an analog signal. For example, the output signal 202 may be a pulse-width modulated (PWM) signal.

The signal path 250 is monitored by an apparatus (comparison circuit) 200 for monitoring a signal path. The apparatus 200 receives the sensor signal 201 and the output signal 202. An output estimation module (not illustrated) of the apparatus 200 determines an estimated output signal of the driver 252 based on the received sensor signal 201. For example, the output estimation module may use a look-up table for determining the estimated output signal. In some examples, the output estimation module may calculate or the estimated output signal based on the input signal (e.g. using a linear equation). A comparison module (not illustrated) of the apparatus 200 determines a state 203 of the signal path 250 based on a deviation of the output signal 202 from the estimated output signal. Accordingly, the apparatus 200 may indicate whether the monitored signal path 250 operates as required. That is, the apparatus 200 may indicate whether the output signal 202 of the signal path 250 is reliable.

For example, the apparatus 200 may indicate three different states of the signal path 250: normal operation (mode) of the signal path 250, degradation of functionality of the signal path 250, and failure of the signal path 250.

Regarding the specific example of an electronic steering support system in the automotive vehicle, the sensor element 230 may be configured to sense a magnetic field. Sensing a magnetic field may, e.g., allow to measure a steering wheel torque or a steering wheel angle (e.g. using the Hall effect). Accordingly, the sensed sensor signal 201 may be indicative of a steering wheel torque or a steering wheel angle. The sensor signal 201 is processed by the ECU 251 and the driver 252 of the signal path 250 in order to provide a control signal for the actuator 240 of the electronic steering support system as an output signal 202 of the signal path 250. For example, the actuator 240 may be an electric motor of the electronic steering support system. The electric motor may, e.g., be coupled to a steering gear of the automotive vehicle. Accordingly, an assistive torque may be applied to the steering gear of the automotive vehicle in order to assist a driver's steering. The assistive torque is based on the measured steering wheel torque and/or steering wheel angle. The output signal 202 may, e.g., be a PWM signal supplied to an H bridge of the electric motor. By adjusting the pulse-width of the PWM signal, a rotation speed of the rotor in the electric motor may be adjusted. Accordingly, the assistive torque provided by the electric motor may be adjusted. In some examples, the output signal 202 may be a PWM signal for controlling a three-phase electric motor.

In the electronic steering support system example, the sensor signal 201 may, e.g., be indicative of a steering wheel torque. Accordingly, a look-up table used by the estimation module of the apparatus 200 may for specific values of the steering wheel torque comprise information on expected output signals of the driver 252 (assuming that the signal path 250 is operating correctly), respectively. If the sensor signal 201 is indicative of a steering wheel angle, the loop-up table may for specific values of the steering wheel angle comprise information on expected output signals of the driver 252 (assuming that the signal path 250 is operating correctly), respectively. For example, the look up table may contain information on the specific shape or pulse-width of a PWM signal provided by the driver 252 as output signal for a specific value of the steering wheel angle or a specific value of the steering wheel torque. Accordingly, the output estimation module of the apparatus 200 may determine the estimated output signal based on this information.

In the "normal operation" state, the difference (deviation) between the output signal 202 and the estimated output signal is below a defined first threshold (e. g. 1%, 2%, 3%, 4%, or 5%). Accordingly, a deviation of the actual behavior of the actor 240 from an intended behavior of the actor 240 is below a first threshold level. The first threshold level may, e.g., be chosen such that a driver may not recognize the deviation. Regarding the electronic steering support system, the first threshold level (i.e. the first threshold for the signal deviation) may be chosen such that the deviation of the motor behavior (i.e. the deviation of the provided assistive torque) is not recognized by the driver within the steering backlash.

In the "degradation of functionality" state, the difference (deviation) between the output signal 202 and the estimated output signal is below a defined second threshold (e. g. 8%, 9%, 10%, 11%, or 12%) but above the first threshold. That is, a deviation of the actual behavior of the actor 240 from an intended behavior of the actor 240 is above the first threshold level. Accordingly, a driver may recognize the difference in behavior of the actor 240. Regarding the electronic steering support system, a higher steering force may, e. g., be necessary for a driver. Moreover, the electronic steering support system may signalize the "degradation of functionality" state to the driver (e.g. by a warning light in the dashboard, an acoustic signal, or a haptic feedback).

In the "failure" state, the difference (deviation) between the output signal 202 and the estimated output signal is above the second threshold. That is, the difference (deviation) between the output signal 202 and the estimated output signal is that great that the functionality of the system including or relying on the signal path 250 can no longer be secured and needs to be disabled. Regarding the electronic steering support system, the electronic steering support system may be switched off and an error may be signalized to the driver (e.g. warning light in the dashboard, acoustic signal or haptic feedback).

Accordingly, a high diagnostic coverage of the signal path 250 and, hence, the electronic steering support system regarding failures may be provided by the apparatus 200 for monitoring a signal path.

Figure 3:
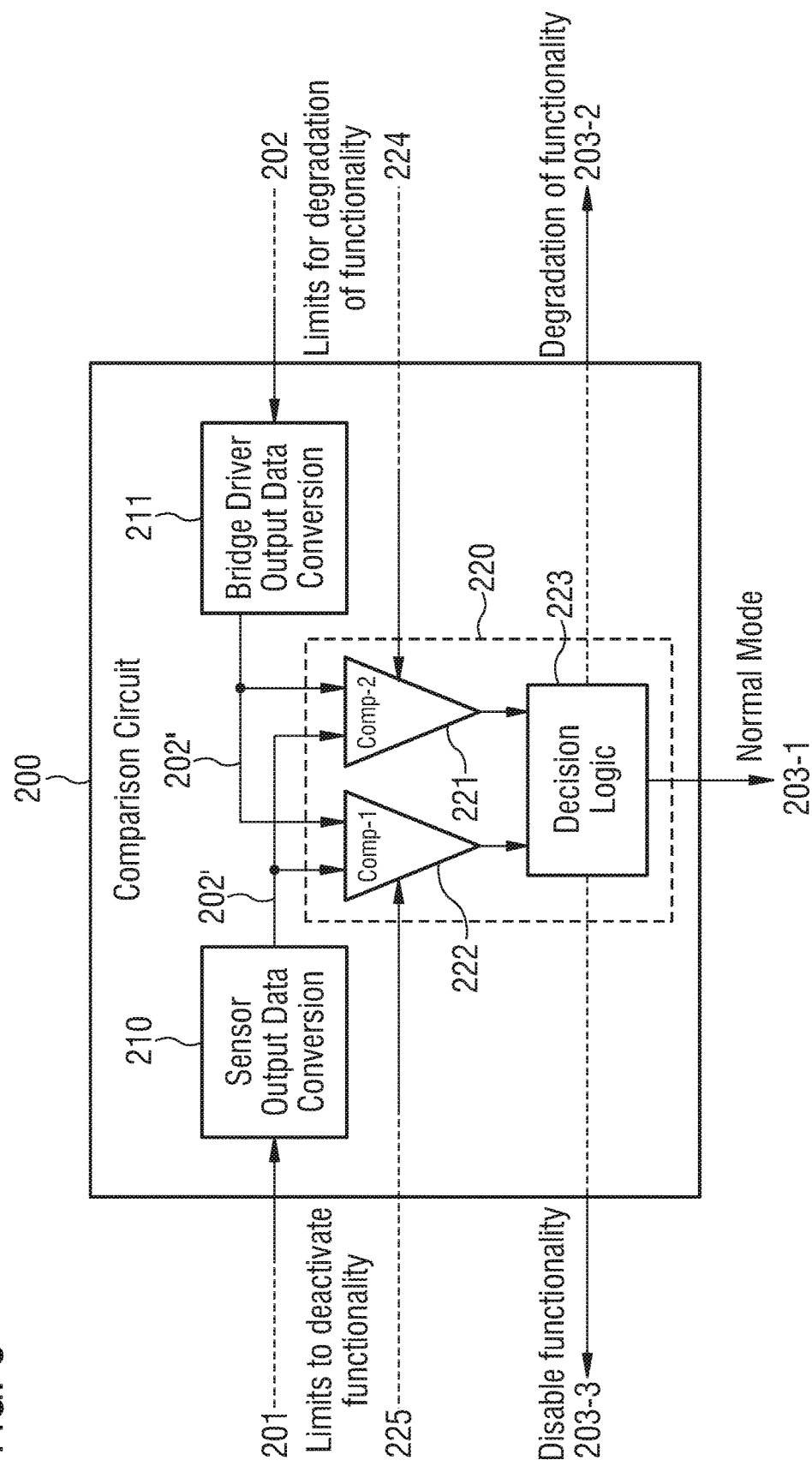
FIG. 3 illustrates an exemplary implementation of the apparatus for monitoring a signal path illustrated in FIG. 2.

An exemplary implementation of the apparatus 200 for monitoring a signal path is illustrated in FIG. 3. The apparatus 200 receives the input signal 202 and the output signal 202. The output estimation module 210 of the apparatus 200 receives the input signal 201 and determines the estimated output signal 202' of the driver 252 (as an example of a second processing unit) based on the input signal 201. Further, the apparatus 200 comprises the comparison module 220. The comparison module 220 receives the estimated output signal 202' and the output signal 202.

Optionally, the apparatus 200 may comprises a conversion module 211 configured to generate a converted output signal 202" based on the output signal 202. The information represented by the converter output signal 202" corresponds to the information represented by the output signal 202. For example, the conversion module 211 module may digitize the output signal 202. That is, the converted output signal 202" may in some examples be the digital replica of the analog output signal 202. In some examples, the conversion module 211 may change a format of the output signal 202 as required for the comparison with the estimated output signal 202'. As illustrated in FIG. 3, if the apparatus 200 comprises the conversion module 211, the comparison module 220 receives the estimated output signal 202' and the converted output signal 202" (which is equivalent to the output signal 202).

The comparison module 220 comprises a first comparator 221. The first comparator 221 receives the estimated output signal 202' and the output signal 202. If the apparatus 200 comprises the conversion module 211, the first comparator 221 receives the converted output signal 202" instead of the output signal 202. Further, the first comparator 221 receives a signal 224 indicative of the first threshold (e.g. representing the boundary between normal operation and degradation of functionality). The first comparator 221 is configured to compare the estimated output signal 202' and the output signal 202, or alternatively the estimated output signal 202' and the converted output signal 202". That is, the first comparator 221 is configured to determine whether the deviation of the output signal 202 from the estimated output signal 202' is above or below the first threshold. Since the converted output signal 202" is equivalent to the output signal 202, also comparing the estimated output signal 202' and the converted output signal 202" allows to determine whether the deviation of the output signal 202 from the estimated output signal 202' is above or below the first threshold.

Moreover, the comparison module 220 comprises a second comparator 222, which receives the estimated output signal 202' and the output signal 202. If the apparatus 200 comprises the conversion module 211, the second comparator 222 receives the converted output signal 202" instead of the output signal 202. Further, the second comparator 222 receives a signal 225 indicative of the second threshold (e.g. representing the boundary between degradation of functionality and failure). The second comparator 222 is configured to compare the estimated output signal 202' and the output signal 202, or alternatively the estimated output signal 202' and the converted output signal 202". That is, the second comparator 222 is configured to determine whether the deviation of the output signal 202 from the estimated output signal 202' is above or below the second threshold. Since the converted output signal 202" is equivalent to the output signal 202, also comparing the estimated output signal 202' and the converted output signal 202" allows to determine whether the deviation of the output signal 202 from the estimated output signal 202' is above or below the second threshold.

For example, the first comparator 221 may provide a binary determination result, where 0 indicates that the deviation is below the first threshold and 1 indicates that the deviation is above the first threshold, or vice versa. Alternatively, the first comparator 221 may provide a true/false determination result, where "true" indicates that the deviation is below the first threshold and "false" indicates that the deviation is above the first threshold, or vice versa. Similarly, the second comparator 222 may provide its determination result.

The determination results are supplied (provided) to a decision logic 223 of the comparison module 220. The decision logic 223 is configured to determine the state of the signal path based on the determination results of the first comparator 221 and the second comparator 222. For example, the decision logic 223 determines that the signal path is in a first state 203-1 indicating normal operation of the signal path if the determination result of the first comparator 221 indicates that the deviation of the signals is below the first threshold and the determination result of the second comparator 222 indicates that the deviation of the signals is below the second threshold. For example, the decision logic 223 determines that the signal path is in a second state 203-2 indicating degradation of functionality of the signal path if the determination result of the first comparator 221 indicates that the deviation of the signals is above the first threshold and the determination result of the second comparator 222 indicates that the deviation of the signals is below the second threshold. For example, the decision logic 223 determines that the signal path is in a third state 203-3 indicating failure of the signal path if the determination result of the first comparator 221 indicates that the deviation of the signals is above the first threshold and the determination result of the second comparator 222 indicates that the deviation of the signals is above the second threshold. In case the determination results of the first comparator 221 and the second comparator 222 are contradictory (i.e. inconsistent), the decision logic 223 may, e.g., determine that the signal path is in the third state 203-3 or indicate a failure of the apparatus 200. For example, if the determination result of the first comparator 221 indicates that the deviation of the signals is below the first threshold and the determination result of the second comparator 222 indicates that the deviation of the signals is above the second threshold, the decision logic 223 may determine that the signal path is in the third state 203-3 or indicate a failure of the apparatus 200.

For example, the apparatus 200 may be implemented by an 8 bit microcontroller, a 16 bit microcontroller, or any dedicated equivalent hardware component (e.g. an Application Specific Integrated Circuit, ASIC).

The exemplary apparatus 200 illustrated in FIG. 3 may allow high diagnostic coverage of a monitored signal path. Moreover, the apparatus 200 may provide self-diagnostic functionality.

Figures 4, 5:
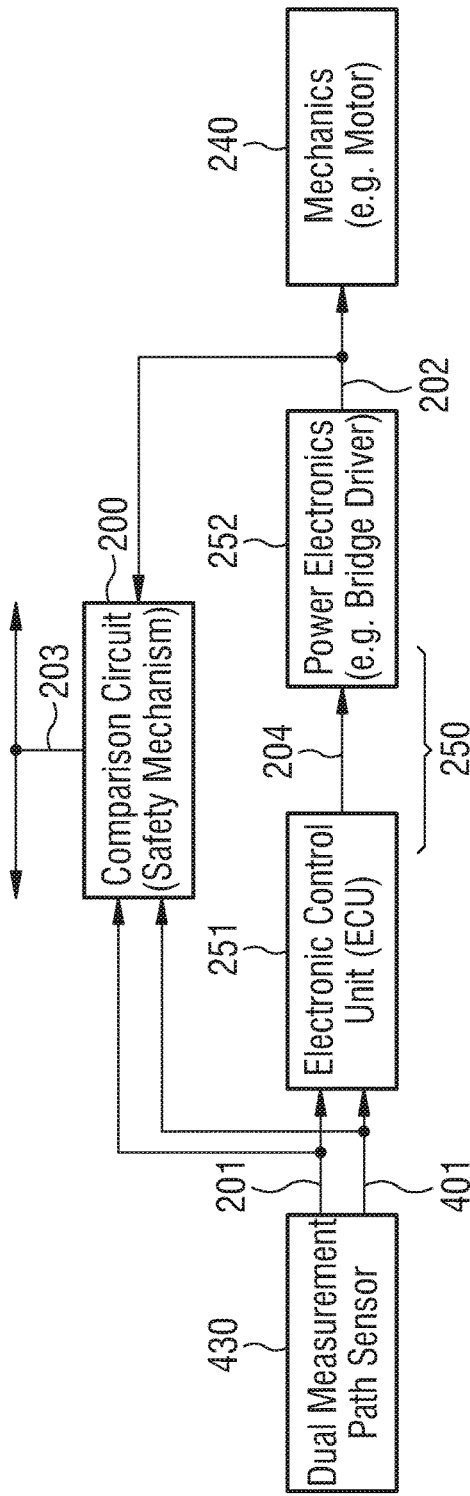
FIG. 4 illustrates another example of a signal processing system.
FIG. 5 illustrates an example of a method for monitoring a signal path.

In FIG. 4 another example of a signal processing system is illustrated. The signal processing system of FIG. 4 is similar to the one illustrated in FIG. 2. However, the sensor element 430 provides in addition to the sensor signal 201, which is indicative of a physical quantity, a second sensor signal 401, which is indicative of the identical physical quantity. That is, the ECU 251 as an example for a first processing unit of a signal path receives the input signal and the second input signal, wherein both input signals comprise information on an identical quantity, respectively. The ECU 251 may hence generate the first signal 204 based the sensor signal 201 and the second sensor signal 401.

Accordingly, the output estimation module of the apparatus 200 for monitoring a signal path may be further configured to determine the estimated output signal based on the second input signal 401. That is, the input signal 201 and the second input signal 401 may be used for determining the estimated output signal. The redundancy of the inputs may be used for testing the consistency of both signals. For example, if the input signal 201 and the second input signal 401 indicate different values, the ECU 251 or the apparatus 200 may indicate failure of the sensor element or the sensor path coupling the sensor element 430 and the ECU 251. Hence, a higher diagnostic coverage of the sensor element 430 and the signal path 250 may be provided.

Alternatively, the output estimation module of the apparatus 200 for monitoring a signal path may be further configured to determine a second estimated output signal of the driver 252 (being an example for a second processing unit of a signal path) based on the second input signal 401. That is, the output estimation module may determine the estimated input signal based on the input signal 201, and a second estimated input signal based on the second input signal 401. Accordingly, the comparison module of the apparatus 200 may be further configured to determine the state of the signal path based on a deviation of the output signal from the second estimated output signal. For example, the comparison module may use one of the above described concepts for determining the deviation of the output signal from the second estimated output signal. Based on the deviation results for the first estimated output signal and the second estimated output signal, the state of the signal path may be determined. For example, if a first state for the signal path is determined for the deviation of the first estimated output signal and a different second state for the signal path is determined for the deviation of the second estimated output signal, failure of the signal path may be indicated by the comparison module. Hence, a higher diagnostic coverage of the sensor element 430 and the signal path 250 may be provided.

An example of a method 500 for monitoring a signal path is illustrated in FIG. 5. The signal path comprises a first processing unit, which generates a first signal based on an input signal of the signal path, and a second processing unit, which generates an output signal of the signal path, wherein the output signal depends on the first signal. The method 500 comprises determining 502 an estimated output signal of the second processing unit based on the input signal. Further, the method 500 comprises determining 504 a state of the signal path based on a deviation of the output signal from the estimated output signal. Determining a deviation of the signal path's output signal from an estimated output signal of the signal path may allow to determine whether the signal path is working properly. Hence, a state of the monitored signal path may be determined. That is, the method 500 may indicate whether the monitored signal path operates as desired and whether the output signal of the signal path is reliable.

More details and aspects of the method are mentioned in connection with the proposed concept or one or more examples described above (e.g. FIGS. 1-4). The method may comprise one or more additional optional features corresponding to one or more aspects of the proposed concept or one or more examples described above.

The aspects and features mentioned and described together with one or more of the previously detailed examples and figures, may as well be combined with one or more of the other examples in order to replace a like feature of the other example or in order to additionally introduce the feature to the other example.

Examples may further be a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, ASIC, field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other example examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for monitoring a signal path, the signal path comprising a first processing unit, which is configured to generate a first signal based on an input signal of the signal path, and a second processing unit, which configured to generate an output signal of the signal path, wherein the output signal depends on the first signal, the apparatus comprising:
   an output estimation module configured to determine an estimated output signal of the second processing unit based on the input signal; and
   a comparison module configured to determine a state of the signal path based on a deviation of the output signal from the estimated output signal.

2. The apparatus of claim 1, wherein the comparison module is configured to determine a first state of the signal path if the deviation of the output signal from the estimated output signal is below a first threshold, to determine a second state of the signal path if the deviation of the output signal from the estimated output signal is below a second threshold different from the first threshold, and to determine a third state of the signal path if the deviation of the output signal from the estimated output signal is greater than the second threshold.

3. The apparatus of claim 2, wherein the first state indicates normal operation of the signal path, wherein the second state indicates degradation of functionality of the signal path, and wherein the third state indicates failure of the signal path.

4. The apparatus of claim 2, wherein the comparison module comprises a first comparator configured to determine whether the deviation of the output signal from the estimated output signal is above or below the first threshold, a second comparator configured to determine whether the deviation of the output signal from the estimated output signal is above or below the second threshold, and a decision logic configured to determine the state of the signal path based on determination results of the first comparator and the second comparator.

5. The apparatus of claim 1, wherein the output estimation module is configured to determine the estimated output signal using a look-up table, wherein the look-up table comprises information on a first estimated output signal, which is allocated to a first input signal, and information on a different second estimated output signal, which is allocated to a second input signal, the second input signal being different from the first input signal.

6. The apparatus of claim 1, wherein the first processing unit further receives a second input signal, the input signal and the second input signal comprising information on an identical quantity, respectively, and wherein the output estimation module is further configured to determine the estimated output signal based on the second input signal.

7. The apparatus of claim 1, wherein the first processing unit further receives a second input signal, the input signal and the second input signal comprising information on an identical quantity, respectively, wherein the output estimation module is further configured to determine a second estimated output signal of the second processing unit based on the second input signal, and wherein the comparison module is further configured to determine the state of the signal path based on a deviation of the output signal from the second estimated output signal.

8. The apparatus of claim 1, wherein the estimated output signal of the second processing unit is an expected representation of the output signal generated by the second processing unit.

9. The apparatus of claim 1, wherein the output estimation module generates the estimated output signal based on the input signal.

10. A signal processing system, comprising:
a signal path comprising a first processing unit and a second processing unit, wherein the first processing unit is configured to generate a first signal based on an input signal of the signal path, and wherein the second processing unit is configured to generate an output signal of the signal path, wherein the output signal depends on the first signal; and
an apparatus configured to monitor the signal path, wherein the apparatus comprises:
an output estimation module configured to determine an estimated output signal of the second processing unit based on the input signal; and
a comparison module configured to determine a state of the signal path based on a deviation of the output signal from the estimated output signal.

11. The signal processing system of claim 10, further comprising a component coupled to the signal path to provide the input signal.

12. The signal processing system of claim 11, wherein the component comprises a sensor element configured to provide a sensor signal indicative of a physical quantity as the input signal.

13. The signal processing system of claim 12, wherein the sensor element is configured to sense a magnetic field.

14. The signal processing system of claim 12, wherein the sensor signal is indicative of a steering wheel torque.

15. The signal processing system of claim 10, wherein the output signal is a pulse-width modulated signal.

16. The signal processing system of claim 10, wherein the first processing unit is an electronic control unit of an automotive vehicle, and wherein the second processing unit is a driver for an actuator of the automotive vehicle.

17. The signal processing system of claim 16, wherein the actuator is an electric motor of an electronic steering support system of the automotive vehicle.

18. The signal processing system of claim 10, wherein the estimated output signal of the second processing unit is an expected representation of the output signal generated by the second processing unit.

19. The signal processing system of claim 10, wherein the output estimation module generates the estimated output signal based on the input signal.

20. A method for monitoring a signal path, the signal path comprising a first processing unit, which generates a first signal based on an input signal of the signal path, and a second processing unit, which generates an output signal of the signal path, wherein the output signal depends on the first signal, comprising:
determining an estimated output signal of the second processing unit based on the input signal; and
determining a state of the signal path based on a deviation of the output signal from the estimated output signal.

21. The method of claim 20, wherein a first state of the signal path is determined if the deviation of the output signal from the estimated output signal is below a first threshold, a second state of the signal path is determined if the deviation of the output signal from the estimated output signal is below a different second threshold, and a third state of the signal path is determined if the deviation of the output signal from the estimated output signal is greater than the second threshold.

22. The method of claim 21, wherein the first state indicates normal operation of the signal path, wherein the second state indicates degradation of functionality of the signal path, and wherein the third state indicates failure of the signal path.

23. The method of claim 20, wherein the first processing unit further receives a second input signal, the input signal and the second input signal comprising information on an identical quantity, respectively, and wherein determining the estimated output signal is further based on the second input signal.

24. The method of claim 20, wherein the first processing unit further receives a second input signal, the input signal and the second input signal comprising information on an identical quantity, respectively, wherein the method further comprises determining a second estimated output signal of the second processing unit based on the second input signal, and wherein determining the state of the signal path is further based on a deviation of the output signal from the second estimated output signal.

25. The method of claim 20, wherein the estimated output signal of the second processing unit is an expected representation of the output signal generated by the second processing unit.

26. The method of claim 20, wherein determining the estimated output signal comprises generating the estimated output signal based on the input signal.

* * * * *